United States Patent [19]

Barnett

[11] Patent Number: 4,954,360

[45] Date of Patent: Sep. 4, 1990

[54] METHOD OF INHIBITING ICE CRYSTAL GROWTH IN FROZEN FOODS AND COMPOSITIONS

[76] Inventor: Ronald E. Barnett, R.D. 5, Gage Rd., Brewster, N.Y. 10509

[21] Appl. No.: 218,531

[22] Filed: Jul. 15, 1988

Related U.S. Application Data

[63] Continuation-in-part of Ser. No. 77,142, Jul. 23, 1987, abandoned.

[51] Int. Cl.$^5$ .............................................. A23G 9/00
[52] U.S. Cl. ................................... 426/565; 426/327; 426/329; 426/330.2; 426/566; 426/567; 426/548; 426/804; 426/654
[58] Field of Search ............... 426/327, 249, 330.2, 426/334, 330, 565, 566, 567, 804, 548, 654

[56] References Cited

U.S. PATENT DOCUMENTS

| | | | |
|---|---|---|---|
| 4,242,367 | 12/1980 | Igoe | 426/573 |
| 4,619,831 | 10/1986 | Sharma | 426/804 |
| 4,626,441 | 12/1986 | Wolkstein | 426/548 |
| 4,631,196 | 12/1986 | Zeller | 426/804 |
| 4,698,232 | 10/1987 | Sheu et al. | 426/804 |
| 4,714,620 | 12/1987 | Bunich et al. | 426/804 |
| 4,747,881 | 5/1988 | Shaw et al. | 426/804 |

FOREIGN PATENT DOCUMENTS 61-130619  12/1987  Japan.

OTHER PUBLICATIONS

"Characterization of Freezing Inhibitors from Winter Wheat Cultivars", L. L. Sherman et al., Crop Science, vol. 13, 9–10/73, pp. 514–519.

"Sensory Textural Properties of Stabilized Ice Cream", L. J. Moore, et al., Journal of Food Science, vol. 46(1981), pp. 399–409.

"Effect of Locust Bean Gum and Selected Sweetening Agents on Ice Recrystallization Rates", E. K. Harper et al., Journal of Food Science, vol. 48 (1983), pp. 1801–1806.

"Effects of Polysaccharide Stabilizers on the Nucleation of Ice", A. H. Muhr et al., Journal of Food Technology, vol. 21 (1986), pp. 587–603.

"Assessment of Polysaccharides as Ice Cream Stabilizers", John I. L. Cottrell et al., Journal Sci. Food Agriculture, vol. 30 (1979), pp. 1085–1088.

"Comparative Study of Plant Gums, Gelatin, and Sodium Alginate as Stabilizers in Buffalo Milk Ice Cream Mixes", K. S. Minhas et al., Journal of Food Science and Technology, vol. 21, Jan./Feb. 1984, pp. 32–35.

"A New Method for the Selection of Stabilizers in the Ice Cream Industry", T. Jan, Zucker Und Sueswarenwirtschaft, vol. 31, No. 8 (1978).

*Primary Examiner*—Jeanette Hunter
*Attorney, Agent, or Firm*—Jeffrey M. Hoster

[57] ABSTRACT

Ice crystal growth in inhibited in frozen food products by adding a partially delignified plant fiber, a hemicellulose B or mixtures thereof to the frozen food product.

20 Claims, No Drawings

METHOD OF INHIBITING ICE CRYSTAL GROWTH IN FROZEN FOODS AND COMPOSITIONS

This patent application is a Continuation-in-Part (CIP) of U.S. Ser. No. 077,142 filed on July 23, 1987 now abandoned which is incorporated herein by reference.

BACKGROUND OF THE INVENTION

The present invention relates to a method of inhibiting ice crystal growth in frozen foods. In particular, a partially delignified plant fiber, a hemicellulose B or mixtures thereof are added to foods prior to freezing to inhibit ice crystal growth in the food after it is frozen. Additionally, the present invention relates to food products containing the present ice crystal growth inhibitors.

Frozen food technology, and in particular quick freezing technology, has provided many conveniences in recent years. However, the frozen food industry has been plagued with a phenomenon caused by the growth of ice crystals present in a frozen food into large clumps resulting in frozen food product having a grainy or sandy texture. The growth of the ice crystals leaches water out of the food formulation and can severely detract from the texture and mouthfeel of the food.

Over abundant ice crystal growth is a particularly annoying problem in food systems where there is a sensitive balance between water and the other ingredients in the food such as ice cream, ice milk, and other frozen confections. Over abundant ice crystal growth occurs over a period of time and is accelerated by subjecting frozen food products to freeze/thaw cycles. In the case of ice cream, the leaching of the water out of the ice cream formulation into the large crystals basically ruins the ice cream and results in a grainy cardboard-like texture. Ice crystal growth is not limited to the outside surface of the frozen food, but occurs throughout the whole frozen food formulation.

The present invention provides a means to improve the stability of frozen foods through the inhibition of ice crystal growth by a decrease in the overage size of ice crystals and decreasing the rate of growth of ice crystals.

SUMMARY OF INVENTION

Briefly, in accordance with the present invention, the stability of frozen foods is improved by adding to such frozen foods a partially delignified plant fiber (PDPF), a hemicellulose B or mixtures thereof (collectively referred to as "ice crystal growth inhibitors") in an amount effective to inhibit ice crystal growth in the frozen food product. Frozen foods contemplated by the present invention include frozen confections such as, ice cream, ice milk, dessert bars, fruit bars and juice bars.

The frozen food compositions of the present invention have improved stability and are less prone to spoil due to over abundant ice crystal growth. These frozen food compositions contain the food ingredients in combination with an ice crystal growth inhibitor.

Of particular interest in the practice of the present invention, frozen confections, such as ice cream, are stabilized by adding to the ingredient mixture prior to freezing an ice crystal growth inhibiting amount of one or more ice crystal growth inhibitors. The frozen confections are suitable for long term storage and can be subjected to freeze/thaw cycles with less chance of spoilage due to ice crystal growth. Preferably, hemicellulose B is employed as the ice crystal growth inhibitor and in particular hemicellulose B extracted from PDPF.

DETAILED DESCRIPTION OF THE INVENTION

When used herein, the terms "partially delignified plant fibers" and "PDPF" refer to any plant fibers which have been Partially delignified. Usually, from about 30 to 70 and preferably about 40 to 60 percent of the lignin should be removed from the plant fiber substrate.

When used herein the term "hemicellulose B" refers to the hemicellulose fraction which precipitates by ethanol from an acidified hemicellulose mixture isolated from plant material by extraction with alkaline solutions.

When used herein the term "inhibiting ice crystal growth" refers to a method wherein the ice crystals formed in frozen foods are prevented from growing into large crystals. This term does not refer to a method of preventing the formation of ice crystals, but rather only to a method of restricting the average size of ice crystals and their rate of growth.

In practicing the present invention, a frozen food product is formulated by incorporating into the frozen food a partially delignified plant fiber (PDPF), a hemicellulose B or mixtures thereof, i.e., ice crystal growth inhibitor. The ice crystal growth inhibitor is added to the food product during processing to form an ingredient mixture which is suitable for freezing. The mixing can be achieved by standard TM ell known mixing techniques such as physically mixing or by standard dry or wet blending techniques. Advantageously, the ice crystal growth inhibitors are added to the aqueous phase or component of the food product. The order of mixing and addition of ingredients is not critical to the practice of the present invention.

The partially delignified plant fibers (PDPF) can be any plant fibers in which about 30 to about 70, and preferably about 40 to 60, percent of the lignin is extracted or removed. Preferably, the partially delignified plant fibers are alkaline peroxide-treated conversion products of lignocellulosic substrates. Alkaline peroxide treatments of nonwoody lignocellulosics are disclosed in the following U.S. Patents or patent applications: U.S. Pat. No. 4,649,113; Ser. No. 06/809,803 filed 12/16/85; and Ser. No. 06/912,296 filed 9/29/86 all of which are incorporated herein by reference. Additionally, all of the specifications of the prior referenced patents are available from the National Technical Information Service, 5285 Port Royal Rd., Springfield, Va 22161.

The hemicellulose B can be obtained from any lignocellulosic plant according to known extraction methods, such as, for example, the extraction method disclosed in METHODS IN CARBOHYDRATE CHEMISTRY, Vol - 5: GENERAL POLYSACCHARIDES, 1965, Academic Press, pp. 144–145. However, it is preferred to extract hemicellulose B from lignocellulosic plants in accordance with the procedures disclosed in my U.S. patent application Ser. No. 077,141 filed evendate herewith now abandoned and entitled HEMICELLULOSE EXTRACTION which is incorporated herein by reference.

The PDPF and the hemicellulose B is obtained from any lignocellulosic substrate but Preferably nonwoody lignocellulosic substrates. Suitable substrates include corn bran, corn stover, corn cobs, wheat bran, sugar cane bagasse, alfalfa hay, barley bran, barley hulls, oat bran, oat hulls, rice bran, sugar beet pulp, citrus pulp, citrus peel, peanut shells, banana peels, okra stover, soy been stover and esparto grass. Preferred substrates include wheat bran, corn bran, corn stover, barley bran, rice bran and oat bran.

The present ice crystal growth inhibitors are added to the ingredient mixture prior to freezing in amounts effective to inhibit ice crystal growth in the frozen food product. Usually, the ice crystal growth inhibitor added in amounts of from about 0.01 to about 2 percent total weight of the food product, advantageously in amounts of from about 0.05 to about 1.0% by total weight and preferably in amounts of from about 0.1 to about 0.5% total weight of the frozen food product. Preferably, PDPF is employed in amounts between about 0.25 and 0.75% total weight of the frozen food product and hemicellulose B is employed in amounts between about 0.1 and 0.5% total weight of the frozen food product.

The present ice crystal growth inhibitors are added to any frozen food product which contains water and especially those frozen food products which are liable to experience freeze/thaw cycles. Typical frozen food products include ice cream, frozen confections, frozen novelties, dessert bars, fruit bars, pudding pops and juice bars. Once these food products are formulated with the present ice crystal growth inhibitors they are less prone to spoilage due to over abundant ice crystal growth.

The present invention contemplates inhibitinq ice crystal growth in any frozen system including "regular" foods and "dietetic" foods containing high potency sweeteners and/or a low fat content. High potency sweeteners which can be incorporated in the present frozen food products include aspartame, salts and complexes of aspartame, aminoacyl sugars, saccharin, sucralose, alitame, acesulfame K, thaumatin, steveoside and the like. Low fat content foods contemplated by the invention includes food products containing fat substitutes, such as sucrose polyester.

When PDPF is employed as the ice crystal growth inhibitor the PDPF is preferably wet milled in a ball mill or pin mill just prior to the point of fiber collapse. The milled PDPF is then blended into the frozen food product during the product formulation process. Preferably, the milled PDPF ice crystal growth inhibitor passes through a 100 mesh screen; i.e. particle size smaller than 100 mesh.

In a preferred embodiment of the present invention, hemicellulose B is employed as the ice crystal growth inhibitor in a frozen food product. Any hemicellulose B can be employed. It is preferred to employ hemicellulose B extracted from PDPF as described herein and especially wheat bran PDPF. The hemicellulose B is preferably employed in amounts of between about 0.05 to about 1.0% by total weight of the food product and even more preferably about 0.25 by total weight of the food product.

The following examples illustrate the practice of this present invention but should not be construed as limiting its scope.

Example 1: Hemicellulose B as an Ice Crystal Growth Inhibitor

Hemicellulose B was extracted from partially delignified wheat bran (obtained from processing wheat bran according to procedures disclosed in U.S. Pat. No. 4,649,113) in a 16 hour aqueous extraction process at room temperature employing NaOH and a pH of 13.0. The reaction mixture was continously stirred and after the 16 hour extraction the supernatant was adjusted to pH 5 with acetic acid. Hemicellulose A precipitated out of the supernatant and was removed by filtration. Ethanol was added to the supernatant in an amount to produce a 70 wt % ethanol concentration resulting in precipitation of the hemicellulose B. Approximately, 11 percent on a weight basis of partially delignified wheat bran was extracted as hemicellulose B. The hemicellulose B obtained is added to the aqueous phase of frozen food products during food processing to inhibit ice crystal growth.

Example 2: PDPF as an Ice Crystal Growth Inhibitor

PDPF, obtained from wheat bran, is wet pin milled to pass through a 100 mesh screen. This PDPF material is added to frozen food products to inhibit ice crystal growth. The resulting frozen food product is stable under freezing conditions. Additionally, this frozen food product is stable when exposed to freeze/thaw cycles.

Example 3: Frozen Food Product Formulations

The following is a list of frozen food product formulations which contain an ice crystal growth inhibitor of the present invention. They are prepared employing standard food processing techniques.

| I. Ice Cream | | |
|---|---|---|
| Non Fat Milk Solids (MSNF) | 11% | |
| Butterfat | 10% | |
| Sugar | 10% | |
| Corn Syrup Solids | 5% | |
| Hemicellulose B | 0.25% | |
| Mono & Diglycerides | 0.1% | |
| Guar Gum | 0.1% | |
| Carrageenan | 0.1% | |
| Polysorbate 80 or 60 | 0.1% | |
| Flavor | To Suit | |
| II. Pudding Pop | | |
| MSNF | 10% | |
| Butterfat | 4% | |
| Sugar | 12% | |
| Corn Syrup Solids | 6% | |
| Cocoa | 3% | |
| Tapioca | 2% | |
| Partially Delignified Plant Fiber (PDPF) | 0.5% | |
| Carrageenan | 0.15% | |
| Polysorbate 80 or 60 | 6.1% | |
| Flavor | To Suit | |
| III. Frozen Novelty | | |
| Fruit Puree - Juice | 30% | (or to suit) |
| Sugar | 12% | |
| Corn Syrup Solids | 6% | |
| Hemicellulose B | 0.25% | |
| Flavor | To Suit | |
| Guar Gum | 0.1% | |
| Carrageenan | 0.1% | |
| IV. Sugar-Free Frozen Dessert | | |
| Milk Solids - Non Fat | 13% | |
| Maltrin M-200 Maltodextrin (18–20 DE) | 5% | |
| Polydextrose type K | 5% | |
| Butterfat | 4% | |
| Sorbitol | 3% | |
| Avicel CL611 | 0.5% | |
| *Stabilizer | 0.3% | |
| Polysorbate 80 | 0.1% | |
| NutraSweet brand of aspartame | 0.1% | |
| Hemicellulose B | 0.25% | |

*Mixture of Mono & Diglycerides, Guar Gum, Carboxymethyl Cellulose (CMC), Carrageennan -continued

| V. Sugar Free-Water Ice | |
|---|---|
| Water | 89.30% |
| Maltodextrin 18-20 DE | 5% |
| Sorbitol | 5.% |
| Citric Acid | .20% |
| *Stabilizer | .20% |
| Flavor | .13% |
| Polysorbate 80 | .10% |
| NutraSweet brand of aspartame | 700 ppm |
| PDPF | 1% |

*Contains Mono & Diglycerides, Guar Gum, CMC, Carrageenan

| VI. No Sugar Added-Chocolate Ice-Milk Bar | |
|---|---|
| Skim Milk | 49.80% |
| Whole Milk | 28.60% |
| Polydextrose Type K | 7.50% |
| Maltodextrin 18-20 DE | 7.50% |
| Non Fat Dry Milk (NFDM) | 4.30% |
| Cocoa (12% Russet Type W) | 2.00% |
| Stabilizer | 0.13% |
| Polysorbate 80 | 0.10% |
| NutraSweet brand of aspartame | 700 ppm |
| PDPF | 1% |

| VII. No Sugar Added-Fruit Bar | |
|---|---|
| Water | 59.43% |
| Strawberry Puree' | 30.00% |
| Maltodextrin 18-20 DE | 5.00% |
| Sorbitol | 5.00% |
| Stabilizer | 0.20% |
| Flavor | 0.20% |
| Polysorbate 80 | 0.10% |
| NutraSweet brand of aspartame | 700 ppm |
| PDPF | 1% |

| VIII. No Sugar Added-Juice Bar | |
|---|---|
| Water | 83.38% |
| 65° Brix Orange Juice Concentrate | 5.90% |
| Maltodextrin 18-20 DE | 5.00% |
| Sorbitol | 5.00% |
| Stabilizer | 5.00% |
| Citric Acid | 0.20% |
| Flavor | 0.15% |
| Polysorbate 80 | 0.10% |
| NutraSweet brand of aspartame | 700 ppm |
| PDPF | 1% |

| IX. No Sugar Added-Fruit and Cream Bar | |
|---|---|
| Skim Milk | 41.45% |
| Strawberry Puree | 35.00% |
| Polydextrose Type K | 7.50% |
| Maltodextrin 18-20 DE | 7.50% |
| Heavy Cream | 4.10% |
| Water | 3.95% |
| Stabilizer | .33% |
| Polysorbate 80 | .10% |
| NutraSweet brand of aspartame | 700 ppm |
| Hemicellulose B | .25% |

In similar operations, PDPF and hemicellulose B, obtained from the various sources described herein, are effective ice crystal growth inhibitors in frozen food products. The resulting frozen food products are more freezer-stable than frozen foods which don't contain the present ice crystal growth inhibitors.

Example 4: Hemicellulose B As Ice Crystal Inhibiting Agent in Sherbet-Type Product The following formulation was prepared using Hemicellulose B obtained from wheat bran by the methods described on the preceding examples:

| Ingredient | Amount |
|---|---|
| 6% Hemicellulose B Solution | 450 ml |
| Water | 405 ml |
| Lemon Juice | 45 ml |
| Nonfat dry milk | 60 gm |

| Ingredient | Amount |
|---|---|
| Aspartame (NutraSweet ® brand) | 0.6 gm |

The resulting frozen dessert was creamy and had a smooth mouthfeel resulting from minimal ice crystal growth. A control was also prepared which did not include Hemicellulose B. The control was icy with a rough mouthfeel.

I claim:

1. A method of inhibiting ice crystal growth in a frozen food product which comprises adding to the frozen aqueous ingredient mixture prior to freezing an effective ice crystal growth inhibiting amount of a partially delignified plant fiber, a hemicellulose B or mixtures thereof.

2. The method of claim 1 wherein the frozen food is a frozen confection.

3. The method of claim 1 wherein the frozen food is ice cream.

4. The method of claim 3 wherein the ice crystal growth inhibitor is a partially delignified plant fiber.

5. The method of claim 3 wherein the ice crystal growth inhibitor is hemicellulose B.

6. The method of claim 1 wherein the frozen food product is ice-milk, dessert bars, fruit bars or juice bars.

7. The method of claim 6 wherein the ice crystal growth inhibitor is a partially delignified plant fiber.

8. The method of claim 6 wherein the ice crystal growth inhibitor is hemicellulose B.

9. The method of claim 6 wherein the frozen food product is a pudding pop.

10. The method of claim 1 wherein the ice crystal growth inhibitor is added to the aqueous ingredient mixture prior to freezing in an amount of from about 0.01 to about 5 percent by total weight of the frozen food product.

11. The method of claim 10 wherein the ice crystal growth inhibitor is present in an amount of from about 0.05 to about 2 percent by total weight.

12. The method of claim 11 wherein the concentration of ice crystal growth inhibitor is from about 0.1 to about 1 percent by weight.

13. A frozen food product composition which comprises:
   (a) food ingredients and
   (b) a partially delignified plant fiber, hemicellulose B or mixtures thereof in amounts effective to inhibit ice crystal growth in the frozen food product.

14. The composition of claim 13 wherein the food ingredients in
   (a) comprise a frozen confection.

15. The composition of claim 13 wherein the frozen food is ice cream.

16. The composition of claim 15 wherein the ice crystal growth inhibitor is hemicellulose B.

17. The composition of claim 15 wherein the ice crystal growth inhibitor is partially delignified plant fiber.

18. The composition of claim 14 wherein the food ingredients are comprised of ice milk, desert bars, fruit bars or juice bars.

19. The composition of claim 13 wherein the ice crystal growth inhibitor is present in the frozen food product in an amount of from about 0.01 to about 5 percent by total weightof the frozen food product.

20. The composition of claim 19 wherein the ice crystal growth inhibitor is present in the frozen food product in an amount of from about 0.1 to about 1 percent by total weight of the frozen food product.

* * * * *